United States Patent
Murali et al.

(10) Patent No.: US 7,844,007 B2
(45) Date of Patent: Nov. 30, 2010

(54) COMBINED OFDMA PREAMBLE INDEX IDENTIFICATION, INTEGER FREQUENCY OFFSET ESTIMATION, AND PREAMBLE CINR MEASUREMENT

(75) Inventors: Partha Sarathy Murali, San Jose, CA (US); Paul Rueuben Vincent, Trichy (IN); Karthik Vaidyanathan, San Jose, CA (US); Phanimithra Gangalakurti, Hyderabad (IN)

(73) Assignee: RedPine Signals, Inc., San Jose, CA (US)

( * ) Notice: Subject to any disclaimer, the term of this patent is extended or adjusted under 35 U.S.C. 154(b) by 169 days.

(21) Appl. No.: 12/146,446

(22) Filed: Jun. 26, 2008

(65) Prior Publication Data

US 2009/0323512 A1  Dec. 31, 2009

(51) Int. Cl.
*H04K 1/10* (2006.01)
*H04B 17/02* (2006.01)
*H04J 11/00* (2006.01)

(52) U.S. Cl. .................... 375/260; 455/135; 370/208

(58) Field of Classification Search ............... 370/203, 370/205, 208, 209, 210, 328, 329, 312, 509, 370/513, 510, 503, 507; 455/13.4, 63.4, 455/134, 135, 115.3; 375/260, 371
See application file for complete search history.

(56) References Cited

U.S. PATENT DOCUMENTS

| | | | |
|---|---|---|---|
| 7,613,104 B2 * | 11/2009 | Bhatt et al. ................. 370/208 |
| 2006/0153282 A1 * | 7/2006 | Jung et al. ................. 375/146 |
| 2008/0039107 A1 * | 2/2008 | Ma et al. .................... 455/450 |
| 2008/0232513 A1 * | 9/2008 | Wang et al. ................. 375/340 |
| 2010/0008216 A1 * | 1/2010 | Li et al. ..................... 370/208 |

* cited by examiner

*Primary Examiner*—Hanh Nguyen
(74) *Attorney, Agent, or Firm*—File-EE-Patents.com; Jay A. Chesavage (57) ABSTRACT

A wireless signal processor for use in identifying a maximum Carrier to Noise Interference Ratio (CINR) associated with a plurality of received OFDMA subcarriers has a candidate generator for forming a plurality of candidate values from a particular set of received subcarriers by forming candidate values based on the received subcarriers in combination with possible integer preamble offsets and possible preamble values. A candidate evaluator selects which of the possible preamble values and integer frequency offset values have the maximum CINR, and provides the maximum CINR with IFO and preamble index as outputs.

15 Claims, 7 Drawing Sheets

Figure 1A
WiMax Station Cell
Prior Art

Figure 1B
WiMax Cells
Prior Art

Figure 2A
WiMax frames
Prior Art

5ms frame

Figure 2B
WiMax preamble (512 pt FFT)
Prior Art

Figure 2C Prior Art
WiMax preamble (Cell 3 Segment 0)

Figure 3
Received preamble (time domain)

| C1S1 assigned | C1S1 assigned | C1S1 assigned |
| +C2S2 assigned | +C2S2 assigned | +C2S2 assigned |
| +C3S0 assigned | +C3S0 assigned | +C3S0 assigned |

302

Figure 4A
Preamble with fractional + integer offset
Prior Art

Figure 4B
Preamble with integer offset only
Prior Art

Figure 4C
Preamble after decimation x3

Figure 4D
Time Domain noise n(t), channel h(t), and filter W(t)

Figure 4E
Time Domain Response of filter W(t)

fo=subcarrier spacing

Figure 4F
Frequency Domain Coefficients filter W(f)

Figure 4G
DC Data Substitution

*Figure 5A*
Wireless Signal Processor

*Figure 6A*
CINR Process

Figure 6B
CINR Process

US 7,844,007 B2

COMBINED OFDMA PREAMBLE INDEX IDENTIFICATION, INTEGER FREQUENCY OFFSET ESTIMATION, AND PREAMBLE CINR MEASUREMENT

FIELD OF THE INVENTION

The present invention relates to a signal processing system for a WiMax processor. In particular, the invention relates to the measurement of integer frequency offset, detection and resolution of a preamble from among a plurality of possible preambles, thereby providing a preamble index which can be resolved into a cell and segment, and also the estimation of an associated CINR (Carrier to Interference plus Noise Ratio) which indicates the best cell station originating this particular preamble from among the many received.

BACKGROUND OF THE INVENTION

Figures 1A, 1B, 2A:
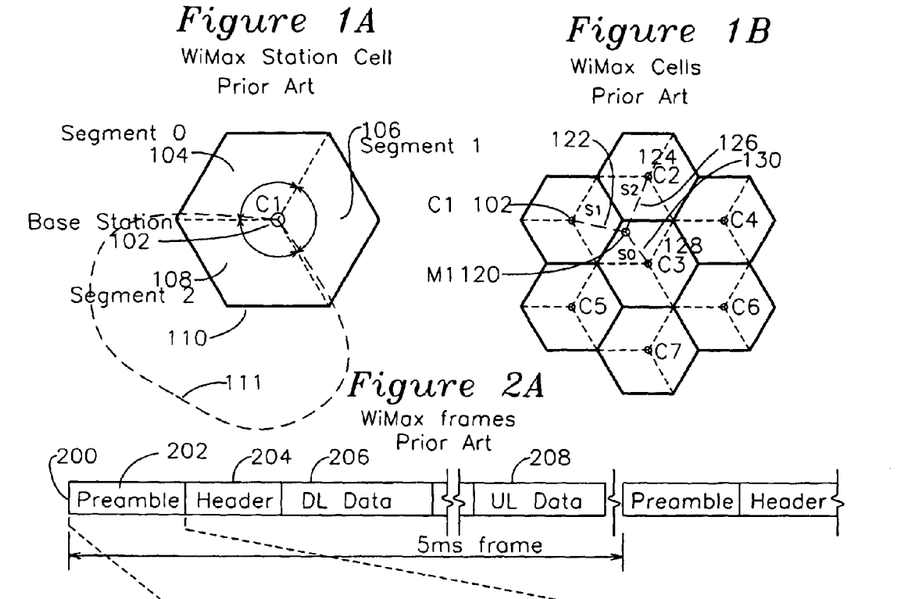
FIG. 1A shows the plan view of a WiMAX station cell and radiation pattern for one segment in a cell.
FIG. 1B shows prior art WiMAX cells such as from FIG. 1A forming a network.
FIG. 2A shows a WIMAX frame series.

There are many systems for the realization of a wireless local area networks (WLAN). From among the large set of protocols described in 802.16 and 802.16e is a subset known as WiMAX, as described in WiMAX Forum "Mobile WiMAX—Part I: Technical Overview and Performance Evaluation" published August 2006, which is incorporated in its entirety by reference. FIG. 1A shows a WiMAX base station C1 102 which operates within the boundaries of a cell 110. In one prior art embodiment, the cell is divided into a plurality of segments, shown as segment 0 104, segment 1 106, and segment 2 108, and the base station uses an adaptive antenna array to generate a preamble which provides preferential signal strength in each segment 104, 106, 108, in succession. One such transmit radiation pattern for an arbitrary cell segment such as segment 2 is shown as 111.

FIG. 1B shows a prior art network of WiMAX cells such as the one described for FIG. 1A, where each cell base station C1, C2, C3, C4, C5, C6, C7 is synchronized to an external time clock such as a GPS timebase, and all base stations operate together to simultaneously transmit a series of WiMAX frames as will be discussed for FIG. 2A. A mobile station M1 120 is located within a cell and is separated from possible base stations C1 through C7 by distances unknown to the mobile station 120. For example, mobile station M1 120 may simultaneously receive at least the preamble part of WiMAX frames from each base station, such that M1 120 receives from C1 102 segment 1 (S1) on path 122, C2 124 segment 2 (S2) on path 126, and B3 128 segment 0 on path 130.

FIG. 2A shows a WiMAX frame 200, which includes a preamble part 202, a header part 204, a downlink data part 206, and an optional uplink data part 208. Each base station B1, B2, etc transmits these 5 ms frames 200 simultaneously using an external reference for timing synchronization, such as GPS timing reference, so that station M1 120 receives the frames 200 from all surrounding stations substantially simultaneously, other than time of flight delays and timing resolution errors. The frames 200 are modulated with Orthogonal Frequency Division Multiplexing Multiple Access (OFDMA) subcarrier tones, whereby a communications channel having frequency bandwidth is subdivided into as many as 2048 subcarriers, each subcarrier separated by 10.94 Khz and combinations of these subcarriers are selected such that adjacent base stations minimize the simultaneous use of a particular subcarrier, such that a station M1 120 is able to simultaneously receive frames 200 from a plurality of different base stations such as B1, B2, B3, each of which station may have more than one spatial segment, such that the mobile station M1 may use the preamble part of the frame to discern which base stations are nearby, which segment of a particular base station is being received, and which one of the possible base stations from nearby cells is the best candidate for selection for the mobile station M1 to attach and form a wireless LAN.

Figure 2B:
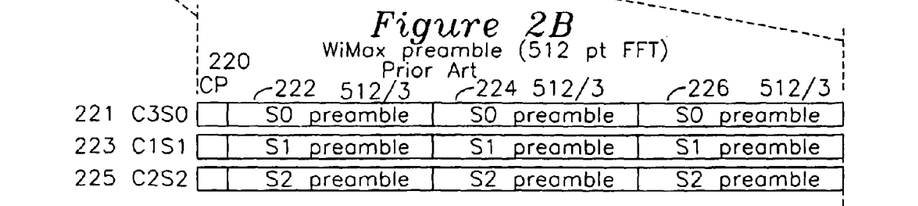
FIG. 2B shows a WIMAX preamble transmitted by three adjacent cells.

All of the cell stations C1 through C7 are sending a unique preamble on each segment, and FIG. 2B shows the preambles of a WiMAX frame 202 being simultaneously transmitted by 3 such cell station and segment combinations. Preamble 221 shows cell 3 segment 0 (C3S0), preamble 223 shows cell 1 segment 1 (C1S1), and preamble 225 shows cell 2 segment 2 (C2S2), corresponding to the preambles received by mobile station M1 120 from cell 3 path 130, cell 2 path 126, and cell 1 path 122. The objective of the mobile station M1 120 which is simultaneously receiving the superset of unique and non-interfering subcarrier combinations from all surrounding stations such as 222, 224, 226, is to identify the strongest received unique preamble from one of these stations and select the associated station for association into the network.

Figure 2C:
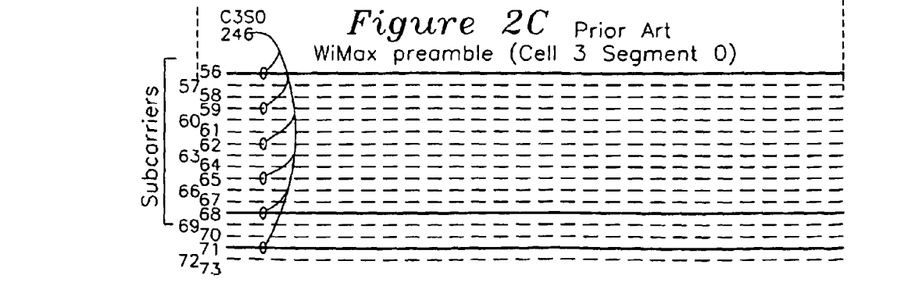
FIG. 2C shows received subcarriers corresponding to a WiMax preamble for a particular cell and segment.

FIG. 2C shows a subset of subcarrier frequencies versus time, including a particular simplified exemplar preamble for cell 3 segment 0 C3S0 246. In this simplified example, C3S0 uses subcarriers 56, 59, 62, 65, 68, 71, of which subcarriers 56, 68, and 71 are active. Cells on segment 1 would use subcarriers 57, 60, 63, 66, 69, 72, unique combinations of which would be active, and cells on segment 2 would use subcarriers 58, 61, 64, 67, 70, 73. In this manner, each segment is operating on a particular subset of ⅓ subcarriers which is separable from the others, as will be described later.

Figure 3:
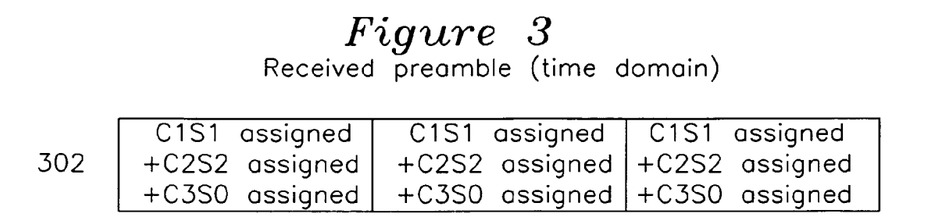
FIG. 3 shows superimposed received preamble subcarriers from a plurality of cells and segments.
Figure 4A:
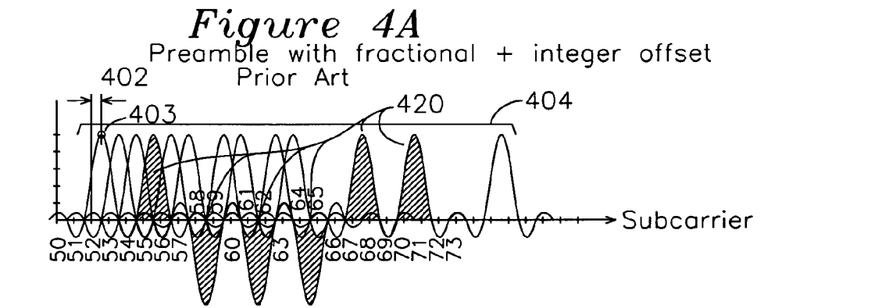
FIG. 4A shows a frequency plot for subcarriers with integer and fractional frequency offset.

FIG. 3 shows a time domain diagram for the preambles received by station M1 120, which include the unique subcarrier combinations for the preambles assigned to each cell and defined by the WiMAX standards for the present example C1S1, C2S2, and S3S0. The received combinations of subcarriers have an offset frequency which is related to the frequency offset from transmitter to receiver. For example, a transmitter which is operating at 2.4 Ghz may have an allowable frequency variation of ±20 ppm, corresponding to ±50 Khz of variation at the transmitter, which has the effect of linearly shifting the entire group of transmitted subcarriers by ±50 Khz. The base stations synchronize in carrier frequency to each other such that surrounding base stations have subcarrier frequency offsets relative to each other which are very small. Since the subcarrier spacing for OFDMA is 10.94 Khz, the receiver subcarriers may be offset from the originally transmitted subcarriers, and the uncertainty of the receiver's ability to locate particular subcarriers can vary by ±5 subcarriers. Typically, a receiver will perform "fractional offset" during symbol timing, whereby the received subcarriers will be placed with the peaks at the sample windows of the FFT. This is shown in FIG. 4A, where a group of subcarriers 404 is received as a superposition of subcarriers from a plurality of stations such as C1S1, C2S2, C3S0 and others. The combination of subcarriers for preamble C3S0 is shown shaded as 420. The first step of the receiver is to remove any frequency ramps, thereby producing a set of subcarriers with a fixed frequency offset 402 of FIG. 4A, with the objective of placing a subcarrier peak 403 at the center of a subcarrier FFT sample point such as 421 of FIG. 4B which shows the removal of fractional offset.

Figure 4B:
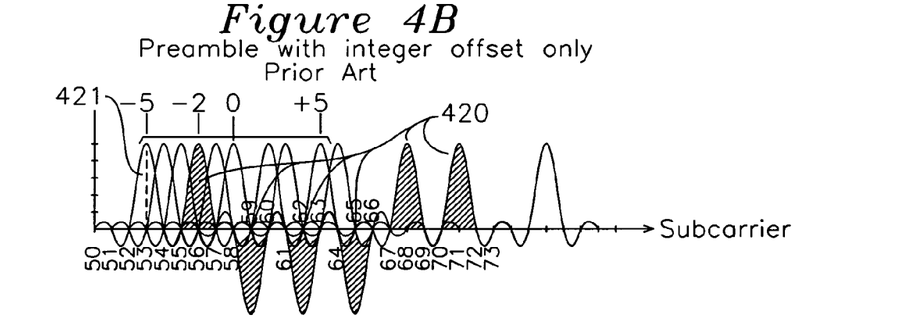
FIG. 4B shows a frequency plot for subcarriers with integer frequency offset.
Figure 4C:
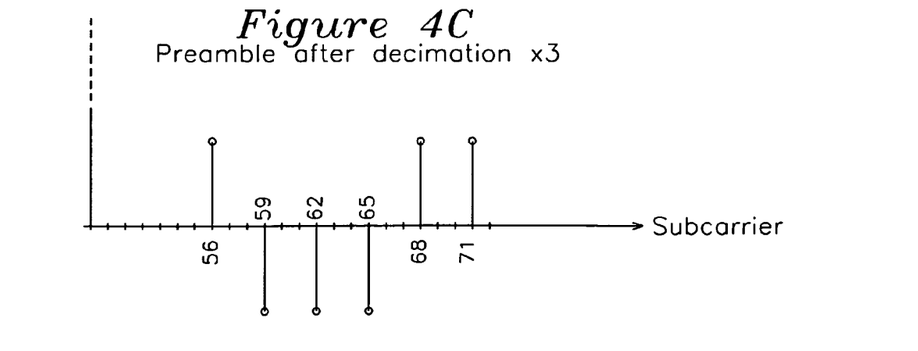
FIG. 4C shows a preamble for a particular station and reuse=3 after decimation.

FIG. 4B also shows the remaining integer offset, such that of a particular preamble subcarrier combination such as that of cell/segment 420 corresponding to C3S0 having the subcarrier pattern [1,−1,−1,−1,1,1] which is present with an integer offset of −2. The objective of cell station selection is to search for the matching subcarrier pattern such as [1,−1,−1,−1,1,1], which is done from the complete subcarrier set [(1,x,y){0,x,y)(0,x,y)(0,x,y)(1,x,y)(1,x,y)] where x and y represent subcarriers which can be ignored for segments 1 and 2, respectively.

OBJECTS OF THE INVENTION

A first object of the invention is the identification of a particular station from a plurality of base stations using received subcarriers and subsets of subcarriers associated with a particular station.

A second object of the invention is the identification and correction of integer carrier offset during a preamble reception interval.

A third object of the invention is the identification of a plurality of strongest preamble subcarriers from a particular base station, optionally including the integer frequency offset (IFO), preamble index, and carrier to interference and noise ratio (CINR).

A fourth object of the invention is a process for generating candidates for evaluation, each candidate formed by performing an integer offset of a stored preamble, decimating the integer offset result by an amount equal to the reuse value, thereafter multiplying the decimated output with each ideal preamble from a generator of ideal preambles, each multiplication being performed for a unique integer frequency offset of the ideal preamble, where the ideal preamble is selected using a first iteration variable, and the integer frequency offset is selected using a second iteration variable.

A fifth object of the invention is a process for evaluating candidates, each candidate accompanied by an IFO value and a preamble index value, the process including:

performing a DC substitution step on a candidate to generate Yk;

a smoothing filter step for convolving Yk with Wk, where the coefficients of Wk in the frequency domain of the candidates is derived from a step function in the time domain;

forming a first value by performing a power calculation for all subcarriers of Yk;

forming a second value by performing a power calculation for all subcarriers of the difference between Yk after dropping edge subcarriers and Yk convolved with Wk after dropping the edge subcarriers of Yk convolved with Wk;

computing a signal value and interference value from said first value, said second value, and a noise value;

computing a carrier to interference and noise ratio (CINR) from the signal value and interference value, each CINR value accompanied by the IFO value and the preamble index value of the associated candidate used to compute the CINR value;

selecting one or more strongest CINR values, each accompanied by the associated IFO value and preamble index value.

SUMMARY OF THE INVENTION

A signal processor receiving a plurality of subcarriers uniquely identifiable to an associated cell station and segment are received and stored. A first iteration variable selects an ideal preamble from a preamble generator to be selected and multiplied with the stored subcarriers. Each multiplication uses a second iteration variable which offsets the stored subcarriers by an integer amount, which are thereafter decimated by the reuse value such as 3 to select a subset of subcarriers associated with a particular segment. The multiplication thereby generates a number of candidate values equal to the product of the number of preambles stored in the preamble generator and the number of subcarrier offsets. In one embodiment, there are 137 preambles contained in the preamble generator and −5 to +5 subcarrier shifts (11 iterations), thereby producing 137*11=1507 candidate values. Each candidate value has a DC value which is modified from 0 to the value of the average of the adjacent values, thereby forming evaluation data also known as Yk. A windowing computation function generates a first value by summing the power of each subcarrier of Yk, and a second value by convolving the series of subcarriers of Yk with the discrete Fourier transform of a windowing function Wk, thereby producing Yk⊗Wk where ⊗ is the convolution operator, such that if a data series [a1 a2 a3] is convolved with [b1 b2 b3] the result is [0 a1*b3 a1*b2+a2*b3 a1*b1+a2*b2+a3+b3 a2*b1+a3*b2 a3*b1 0]. The edge subcarriers are dropped from Yk⊗Wk and subtracted from corresponding subcarriers of Yk with the edge subcarriers dropped to form a subtraction result, for which the power in each subcarrier is summed to generate a second value. The first and second value are provided to a signal and interference calculator along with a noise estimate, thereby producing a signal and interference value, which are fed to a CINR ratio calculator, which calculates CINR, IFO, and Preamble index for each candidate value. One or more ordered maximum CINRs are found from among the candidate values, and the associated IFO and Preamble Index are optionally saved in a table and presented by the signal processor as outputs.

DETAILED DESCRIPTION OF THE INVENTION

Figure 5A:
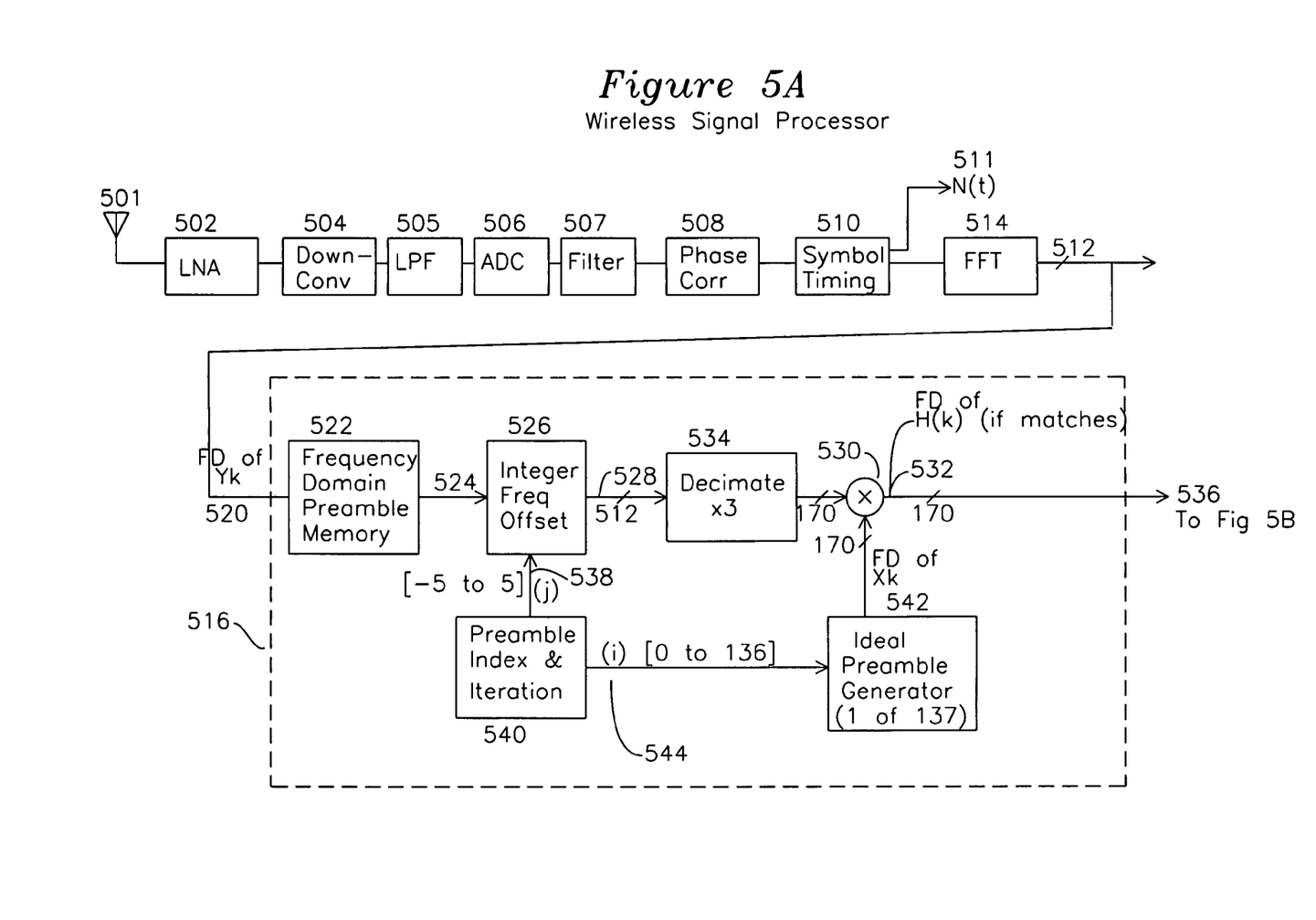
FIGS. 5A and 5B show the block diagram for a wireless signal processor.

FIG. 5A shows one example of a wireless signal processor according to the present invention. A signal is received at antenna 501 which includes a plurality of subcarrier combinations corresponding to those emitted by a variety of cell and segment combinations, as was described in FIGS. 2B. The subcarriers are modulated at a transmit modulation frequency such as 2.4 Ghz, 5 Ghz or 10 Ghz, or any suitable frequency for modulation. The antenna 501 signals are amplified by low noise amplifier 502 and downconverted 504 to baseband such as by mixing with the modulation frequency. The mixer 504 output is filtered 505 to prevent aliasing by analog to digital converter 506, the output of which is filtered 507. A phase corrector 508 operates to rotate the I and Q phases within the I and Q signal processing channels, and symbol timing 510 provides a frequency offset estimate which cancels frequency drifts such as by feeding back a coarse adjustment to a local oscillator of the downconverter 504 and fine adjustment to phase corrector 508. The symbol timing block 510 also provides a noise estimate 511, which will be used later. The symbol timing block 510 is fed to an FFT 514 which provides a plurality of complex outputs, one per subcarrier. The FFT resolution is matched to the number of subcarriers transmitted by the base stations, and common resolutions are 512 point, 1024 point, and 2048 point, although 512 point FFTs will be used in the present example for clarity.

Figures 5B, 5C:
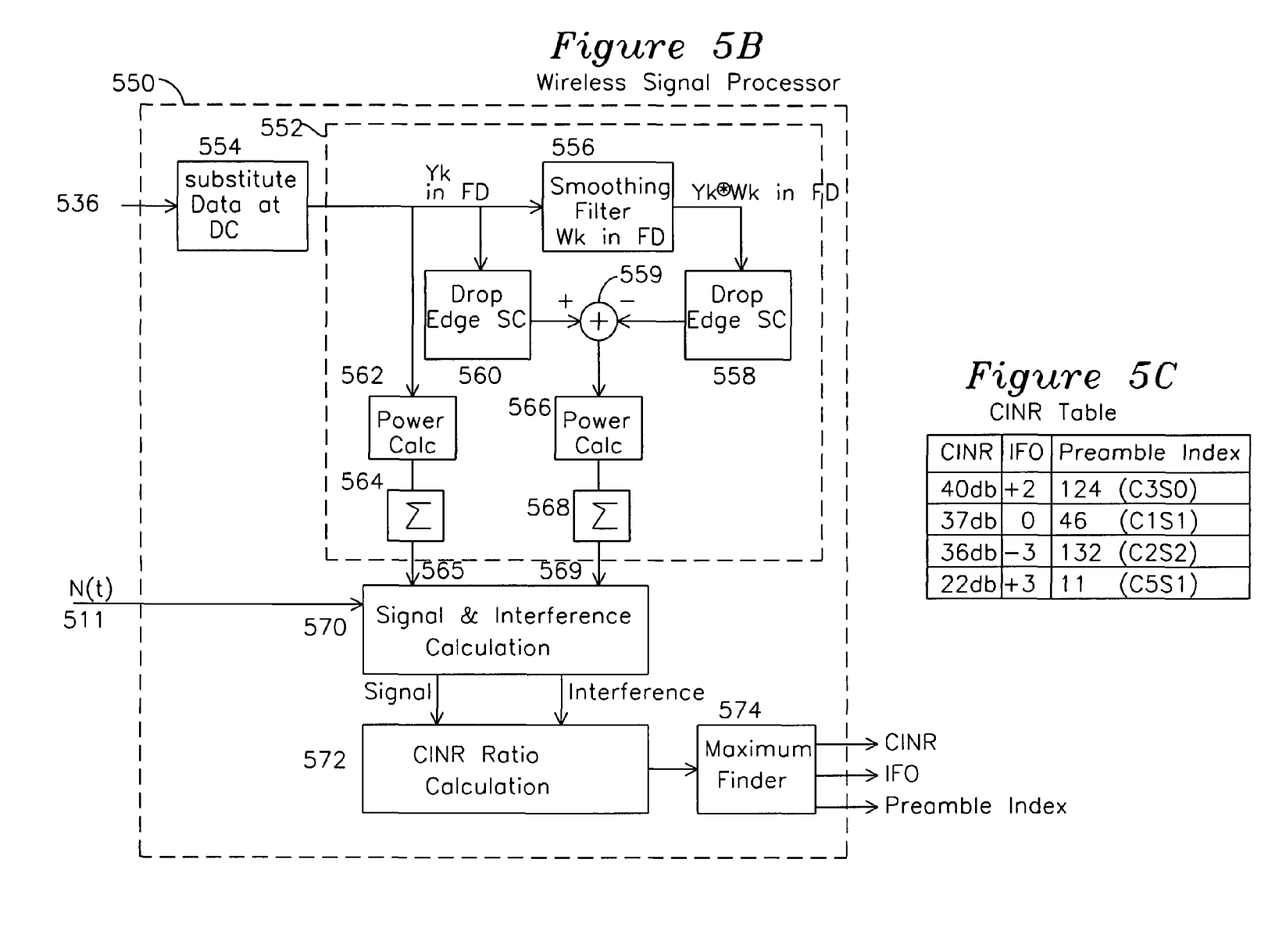
FIG. 5C shows the organization of data in a maximum finder table.

The subcarriers from FFT 514 are fed to a candidate generator 516 which provides a plurality of candidate values via output 536, which are fed to candidate evaluator 550 of FIG. 5B, which determines which candidate has the best Carrier to Interference and Noise Ratio (CINR), and provides the integer frequency offset and preamble index associated with this particular CINR.

Candidate generator 516 has a memory 522 for storing an incoming preamble to be identified across all possible integer frequency offsets and ideal preambles. The ideal preambles are stored in generator 542, which is indexed by a first iteration variable i. A second iteration variable j is used to generate an integer frequency offset, whereby the subcarriers are shifted a corresponding number of slots to the left or right. The first iteration variable and second iteration variable are generated by preamble index and iteration controller 540. In one embodiment, the superposition of subcarriers from the received neighboring cells and segments is stored in preamble memory 522 after fractional offset correction, as was described earlier. The preamble memory 522 provides the received subcarriers to integer frequency offset 526, which shifts the subcarriers over a number of positions controlled by second iteration variable 538 for each value of the first iteration variable 544 which selects one of the ideal preambles 542. To reduce the size of the ideal preamble generator 542, the output of the integer frequency offset 526 is decimated 534, which has the effect of searching in one segment, since the preambles for a particular segment for reuse=3 occur in every third subcarrier. The output of the decimator 534 is multiplied by the ideal preamble of generator 542 to generate one candidate. For a 512 point FFT 514, the preamble memory 522 would store 512 points of data, which after decimation by three 534, would result in 170 complex subcarriers at the output of decimator 534. If the integer frequency offset second iteration variable had a range of [−5 −4 −3 −2 −1 0 1 2 3 4 5] with 11 values of subcarrier shift, and there were 137 possible preambles, the candidate generator would generate one candidate for each iteration, or 11*137=1507 possible candidates to test for each stored preamble in memory 516.

FIG. 5B shows the candidate evaluator 550 of the wireless signal processor. Each candidate which is output by the candidate generator 516 is in succession applied to substitute DC data function 554, which is shown in FIG. 4G. The subcarrier at DC is typically set to 0 in the received subcarrier 0 stored in preamble memory 522. Function 554 sets subcarrier 0 to be the average value of the surrounding subcarriers, such that subcarrier 0 486 of FIG. 4G is 0, whereas subcarriers −1 and +1 have levels 484 and 482 respectively, then subcarrier 0 is set to the average value of 483 as shown. The other subcarrier values are unchanged. The output of the substitute DC data function 554 generates evaluation data known as Yk, which is applied to a power calculator 562, which determines the power level in each subcarrier and feeds this to a summer 564 which sums all of the subcarrier power levels to form a first value 565. Yk is also applied to a smoothing filter convolver 556, which contains a frequency domain filter which actualizes a time domain window Wk impulse response implemented as a frequency domain convolution, as will be described later. The output of the smoothing filter 556 thereby produces Yk⊕Wk, which is applied to a drop edge subcarrier function 558. The output of the drop subcarrier function 558 is subtracted using summer 559 from the drop subcarrier function which operates on Yk, and the output of the summer 559 is applied to power calculator 566, which computes the power in each subcarrier, which is summed 568 to form a second value 569.

Figure 4D:
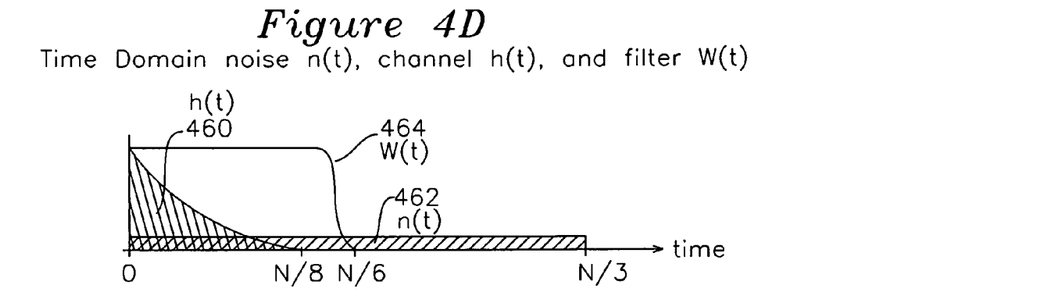
FIG. 4D shows time domain noise, channel function, and filter time response.
Figure 4E:
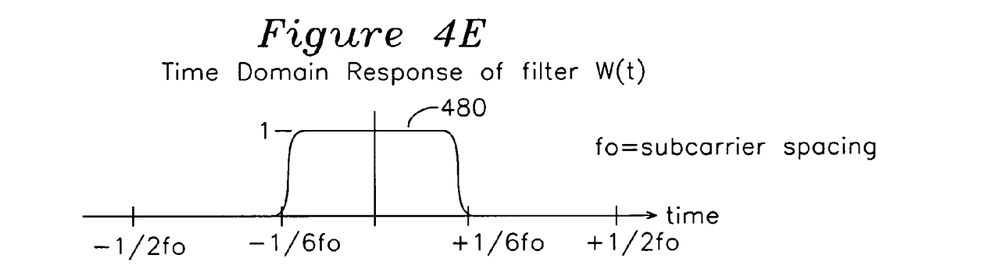
FIG. 4E shows a time domain plot for a window filter response.
Figure 4F:
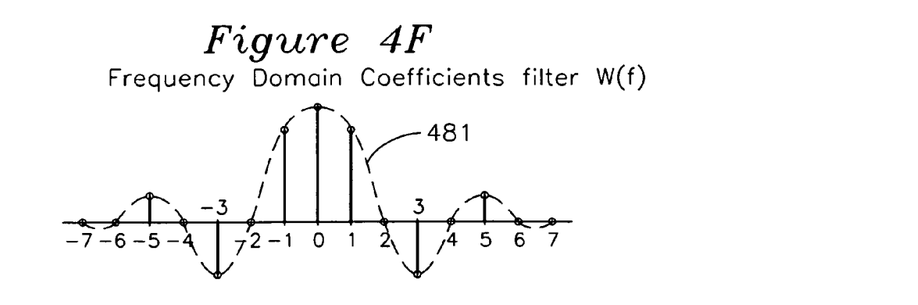
FIG. 4F shows a frequency domain coefficients corresponding to the time response filter of FIG. 4E.
Figure 4G:
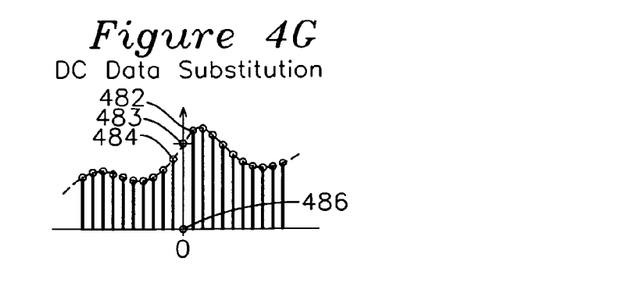
FIG. 4G shows DC data substitution in a plurality of subcarrier samples which include a null at DC.

The function of the window filter Wk is best understood with relation to time domain FIG. 4D. The channel response h(t) 460 occupies N/8 time-domain inputs to the FFT, whereas the noise occupies an entire N/3 (for the case of decimation by 3 when reuse=3). The application of an N/6 window W(t) 464 has the effect of halving the noise power which extends beyond the N/8 cutoff of H(t). FIG. 4E shows the time domain response of filter W(t) 464 of FIG. 4D. W(t) 480 has a corresponding discrete frequency domain transform, shown in the coefficients of points formed by continuous transform plot 481. The careful selection of curve 480 of FIG. 4E can result in the If minimum number of frequency domain coefficients, shown in the example as only requiring the storage of values for FFT frequencies 0, 1 (which is the same value as −1), 3 (which is the same value as −3), and 5 (which is the same value as −5). In this example, only 4 unique values need be stored, which are applied as coefficients of Wk in the convolution operation performed by 556 of FIG. 5B.

Returning to FIG. 5B, the first value 565, second value 569, and a noise value 511 which was derived from the symbol timing 510 are provided to signal and interference calculator 570. The signal and interference calculator performs a two equation solution for S (signal) and I (interference) using equations derived as follows:

A first value representing a signal plus noise power value is $\Sigma |V_1|^2$ where $$V_1 = \sum_{-W<k<W} Y_{n-k} * W_k - Y_n$$

present at the output of summer 559.

The input to filter 556 is $Y_k = S_k + N_k$ where Sk is the signal component and Nk is the noise+interference component expanding the above equations:

$$V_1 = \sum_{-W<k<W} (S_{n-k} + N_{n-k}) * W_k - (S_n + N_n)$$

$$V_1 = \left[ (1-W_0)*S_n + \sum_{\substack{-W<k<W \\ k \neq 0}} S_{n-k} * W_k \right] + \left[ (1-W_0)*N_n + \sum_{\substack{-W<k<W \\ k \neq 0}} (N_{n-k} * W_k) \right]$$

Where the first term of the above equation is the difference between the signal component at the output of the filter 556 and the signal component at the input of filter 556. Although there is some distortion caused by the filter, these two values can be assumed to be the same and the difference between the first two values of the first term can be approximated to 0.

The second term of the above equation constitutes the noise component and the resulting value after squaring and accumulating:

$$\sum |V_1|^2 = |1 - W_0|^2 * \partial^2 + \sum_{\substack{-W<k<W \\ k \neq 0}} |W_k|^2 * \partial^2$$

where $\partial^2$ is the interference+noise power
If the below substitution is made:

$$C1 = |1 - W_0|^2 + \sum_{\substack{-W<k<W \\ k \neq 0}} |W_k|^2$$

the equation describing the power calculation 566 which is applied to 566 and summed 568 is:

$$B * \text{Interference+noise} = \Sigma |V_1|^2 * 1/C1$$

$$\Sigma |V_1|^2 * 1/C1 = B*I+N \text{ (first value)}$$

$$\Sigma (Yk)^2 = BS+N+BI \text{ (sec second value)}$$

where:
B=preamble boost value (a known constant);

$$C1 = |1 - W_0|^2 + \sum_{\substack{-W<k<W \\ k \neq 0}} |W_k|^2$$

N=noise value of channel, such as from 511 of FIG. 5A
I=Ios+Iis, the total interference level from adjacent subcarriers (Ios) and subcarriers from same segments of other base stations which appear in the current subcarrier window (Iis). As the first value and second value are known, as are B, N, and c, it is possible to solve the two equations for S and I.

After S and I are determined, a CINR ratio calculation 572 is performed to determine the CINR for the candidate input at 536, using the following formula:

$$CINR = \frac{\left(\frac{S}{B}\right)}{N + \left(\frac{Iis + Ios}{B}\right)}$$

Each candidate CINR is accompanied by an integer frequency offset (IFO) from the second iteration value associated with this candidate, and a preamble index from the first iteration value associated with this candidate. The maximum finder 574 either ignores the current CINR if it is less than the previous maximum CINR, or stores the current CINR accompanied by IFO and Preamble Index associated with this CINR. Optionally, the maximum finder 574 may construct a table of highest CINRs, such as is shown in FIG. 5C. After all candidates are examined through all combinations of first iteration variable and second iteration variable, the preamble stored in preamble memory 522 has an associated Preamble Index and IFO for use in associating the mobile station which received the preamble to a particular station. The CINR may also be used for other purposes after identification of a particular cell and segment for network association.

Figure 6A:
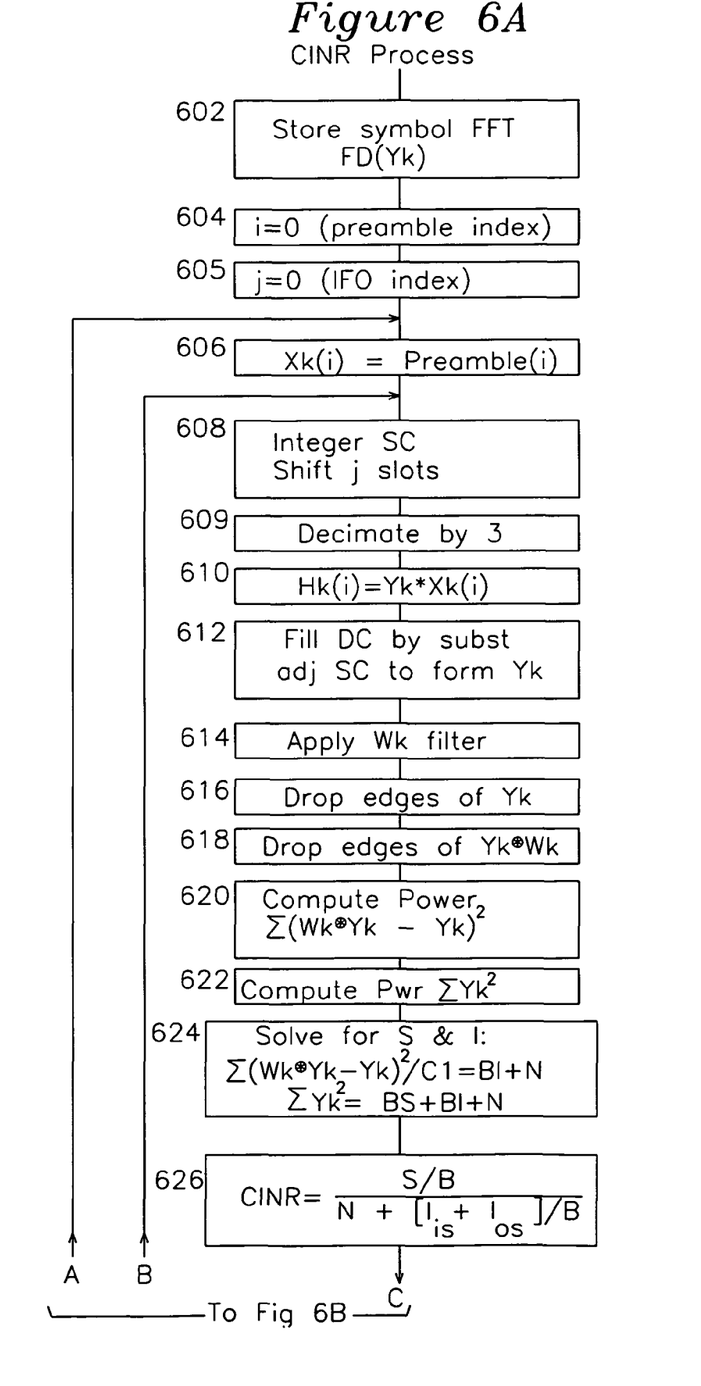
FIGS. 6A and 6B show the process flow for resolving integer frequency offset, CINR, and preamble index from a plurality of received subcarriers.

FIG. 6A shows a CINR process, where a plurality of OFDMA symbols are stored in step 602, and the objective is to find the strongest one based on CINR as well as the accompanying IFO and Preamble Index. First iteration variable i which controls the selection of an ideal preamble is initialized in step 604, and second iteration variable j which controls the integer offset value which shifts all of the stored subcarriers to generate a value to decimate and multiply is shown in step 605. A preamble Xk using i is selected from a table of possible preambles in step 606. An integer subcarrier shift by j slots is performed in step 608, where j may successively have the values [−5, −4, −3, −2, −1, 0, 1, 2, 3, 4, 5] or any set of values which accommodate the expected integer carrier offset due to variations in transmit and receive oscillators, Doppler motion, and the like. After shifting by a value associated with second iteration variable j, the shifted value is decimated 609 according to the number of reuse, shown for reuse=3 in the present example. Step 610 shows the generation of a candidate value by multiplying this particular ideal preamble by a particular integer carrier offset, corresponding to the output 536 of candidate generator 516 of FIG. 5A. Step 612 shows a DC fill by substitution of adjacent subcarriers to form Yk, as was described in FIG. 4G. Step 614 shows the application of the Wk filter to form Yk convolved with Wk, after which the edges are dropped for Yk 616 and also for Yk convolved with Wk 618. A first value is computed as before by summing the power in each subcarrier:

$$\sum |V_i|^2$$

where:

$$V_1 = \sum_{-W<k<W} Y_{n-k} * W_k - Y_n$$

$$Y_k = S_k + N_k$$

where Sk is the signal component and Nk is the noise+interference component.

$$V_1 = \sum_{-W<k<W} (S_{n-k} + N_{n-k}) * W_k - (S_n + N_n)$$

$$V_1 = \left[ \begin{array}{c} (1-W_0)*S_n + \\ \sum_{\substack{-W<k<W \\ k \neq 0}} S_{n-k} * W_k \end{array} \right] + \left[ (1-W_0)*N_n + \sum_{\substack{-W<k<W \\ k \neq 0}} (N_{n-k} * W_k) \right]$$

The first part of the above equation is difference between the signal component at the output of the filter and the signal component at the input of the filter. Though there is some distortion caused by the filter, these two values can be assumed to be the same and the difference can be approximated to 0.

The second term of the above equation constitutes the noise component and the resulting value after squaring and accumulating can be written as:

$$\sum |V_1|^2 = |1-W_0|^2 * \partial^2 + \sum_{\substack{-W<k<W \\ k\neq 0}} |W_k|^2 * \partial^2$$

where $\partial^2$ the interference+noise power $$\text{If } C1 = |1-W_0|^2 + \sum_{\substack{-W<k<W \\ k\neq 0}} |W_k|^2$$

then the interference and noise component is:

$$B^*\text{Interference+noise}=\Sigma|V_1|^2*1/C1$$

A second value is formed by summing the power in the subcarriers of Yk $\Sigma(yk)^2$ in step 622.

As was described previously, the result is two equations in two unknowns, which are solved for S and I:

$$\Sigma|V_1|^2/C1 = B^*I+N \quad \text{(eqn 1)}$$

$$\Sigma(Yk)^2 = BS+N+BI \quad \text{(eqn 2)}$$

where:

B is a known constant preamble boost level;

c is the Wk noise level filtering, preferably 0.5;

I is combined interference from in-segment and out-of-segment;

Using the first value, second value, and noise estimate N, the Signal and Interference values are computed in step 624, which are used to compute the CINR in step 626.

Figure 6B:
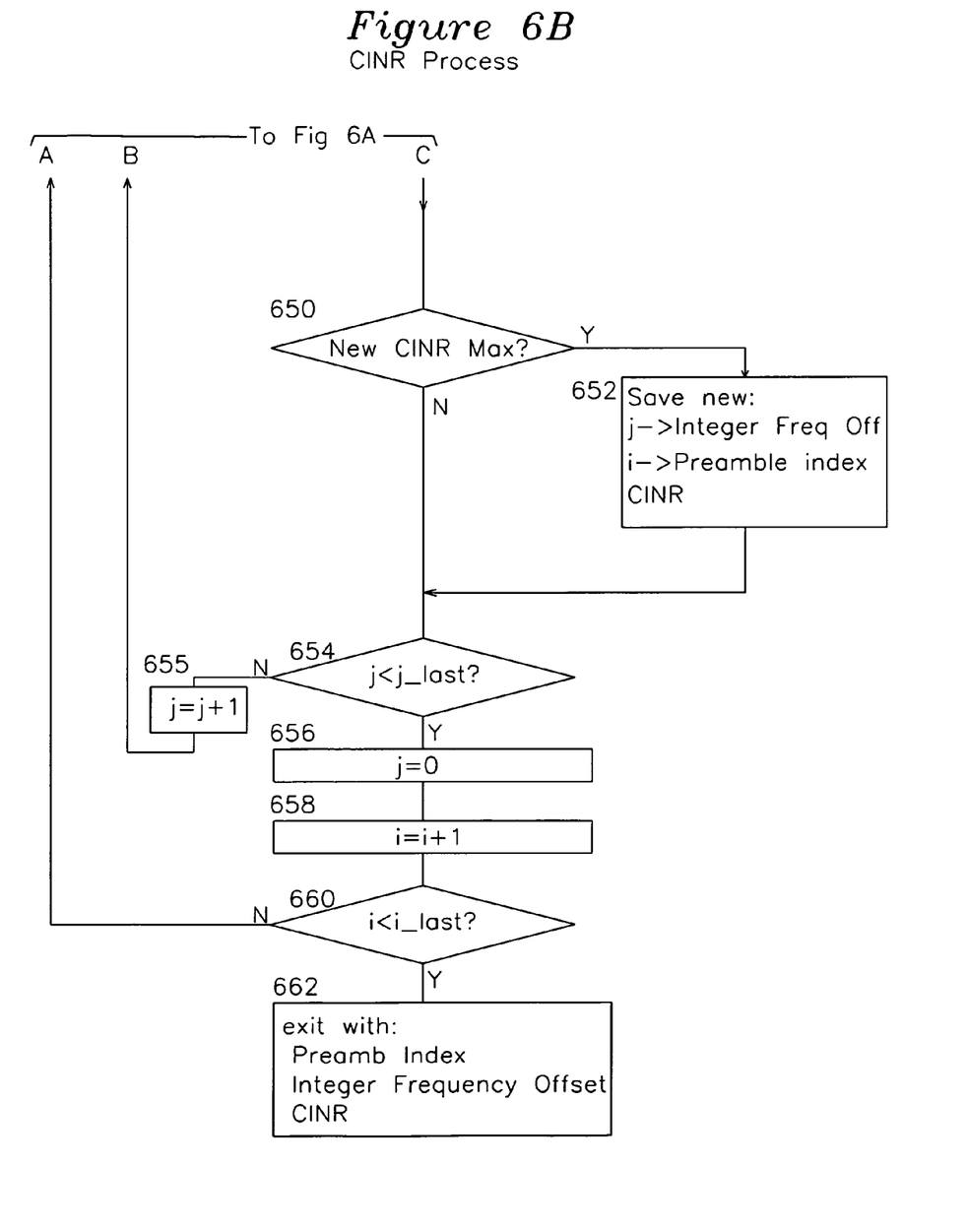

FIG. 6B shows decision step 650, which determines whether the current value of CINR for a particular ideal preamble and subcarrier offset is greater than a previous value. Step 652 is performed to store the new IFO and Preamble Index, along with the new maximum CINR. The iteration loop continues with integer frequency offset second iteration variable j tested in step 654, and either incremented for an inner loop return in step 655, or reset and the ideal preamble first iteration variable incremented in step 658 and tested in step 660. The process completes for a particular stored preamble after all combinations of preambles and integer offsets are tried, exiting with preamble index, integer frequency offset and CINR in step 662.

What is claimed is:

1. A signal processor for determining a maximum Carrier to Interference plus Noise Ratio (CINR) and associated index frequency offset (IFO) and preamble index, the signal processor accepting a preamble, the signal processor having:

a candidate generator accepting said preamble and generating candidates, said candidate generator having:

a preamble memory for storing said preambles;

a first iteration variable coupled to an ideal preamble generator and providing an associated ideal preamble;

a second iteration variable coupled to an integer frequency offset which offsets the contents of said preamble memory by a value determined by said second iteration variable;

a decimator coupled to the output of said integer frequency offset and providing every $m^{th}$ sample as an output, where m is a reuse number;

a multiplier which forms said candidate by multiplying each subcarrier of the output of said decimator with each subcarrier of said ideal preamble generator;

a candidate evaluator accepting a plurality of candidates and selecting one with a maximum carrier to interference and noise ratio (CINR), said candidate evaluator having:

a data substitution which accepts said candidate and generates a Yk value with one subcarrier value set to the average value of adjacent subcarriers;

a first power calculator which computes the power of each subcarrier of Yk, sums the subcarrier powers of Yk, thereby generating a first value;

a first drop edge function which forms an output from Yk by dropping subcarriers at edges;

a smoothing filter accepting said Yk and convolving Yk with Wk, where Wk is a discrete Fourier transform of a window function, Yk convolved with Wk being applied to a second drop edge function which forms an output by dropping subcarriers at edges;

a summer which forms an output by subtracting said second drop edge function output from said first drop edge function output;

a second power calculator determining the power in each subcarrier of said summer output and summing them to form a second value;

a signal and interference calculator which accepts said first value and said second value, to form a signal value and an interference value;

a carrier to interference plus noise ratio (CINR) calculator for computing a CINR value accompanied by said first iteration variable and said second iteration variable;

a maximum finder for storing said CINR value, said associated first iteration variable value, and said associated second iteration variable value if a current said CINR value is greater than a previous said CINR value.

2. The signal processor of claim 1 where said decimator provides every third sample as an output.

3. The signal processor of claim 1 where S and I are computed from:

$$\Sigma|V_1|^2*1/C1 = B^*I+N \text{ (first value)}$$

$$\Sigma(Yk)^2 = BS+N+BI \text{ (second value)}$$

where:

B is a known preamble boost value;

$$C1 = |1-W_0|^2 + \sum_{\substack{-W<k<W \\ k\neq 0}} |W_k|^2$$

N is a known noise value for the channel;

I is combined interference from in-segment and out-of-segment.

4. The signal processor of claim 1 where said Wk has 5 or fewer unique coefficient values.

5. The signal processor of claim 1 where said Wk is the discrete frequency domain realization of a window function in the time domain over the range 0 to N/3 such that events which occur in the time domain from 0 to N/6 are passed and events which occur in the time domain from N/6 to N/3 are filtered.

6. A candidate generator accepting a preamble and generating candidates, said candidate generator having:

a preamble memory for storing said preambles;

a first iteration variable coupled to an ideal preamble generator and providing an associated ideal preamble;

a second iteration variable coupled to an integer frequency offset which offsets the contents of said preamble memory by a value determined by said second iteration variable;

a decimator coupled to the output of said integer frequency offset and providing every $m^{th}$ sample as an output, where m is a reuse number;

a multiplier which forms said candidate by multiplying each subcarrier of the output of said decimator with each subcarrier of said ideal preamble generator.

7. A candidate evaluator accepting a plurality of candidates and selecting one with a maximum carrier to interference and noise ratio (CINR), said candidate evaluator having:

a data substitution which accepts said candidate and generates a Yk value with one subcarrier value set to the average value of adjacent subcarriers;

a first power calculator which computes the power of each subcarrier of Yk, sums the subcarrier powers of Yk, thereby generating a first value;

a first drop edge function which forms an output from Yk by dropping subcarriers at edges;

a smoothing filter accepting said Yk and convolving Yk with Wk, where Wk is a discrete Fourier transform of a window function, Yk convolved with Wk being applied to a second drop edge function which forms an output by dropping subcarriers at edges;

a summer which forms an output by subtracting said second drop edge function output from said first drop edge function output;

a second power calculator determining the power in each subcarrier of said summer output and summing them to form a second value;

a signal and interference calculator which accepts said first value and said second value to form a signal value and an interference value;

a Carrier to Interference plus Noise Ratio (CINR) calculator for computing a CINR value accompanied by said first iteration variable and said second iteration variable;

a maximum finder for storing said CINR value, said associated first iteration variable value, and said associated second iteration variable value if a current said CINR value is greater than a previous said CINR value.

8. The signal processor of claim 1 where said signal and interference calculator accepts said first value, and said second value, and a noise value to form a signal value and an interference value.

9. The signal processor of claim 6 where said signal and interference calculator accepts said first value, and said second value, and a noise value to form a signal value and an interference value.

10. The signal processor of claim 6 where said reuse number m is 2 or 3.

11. The signal processor of claim 6 where said Wk has 5 or fewer coefficients.

12. The signal processor of claim 1 where said first iteration variable or said second iteration variable produces 137 candidates over a range.

13. The signal processor of claim 1 where said first iteration variable or said second iteration variable produces 11 candidates over a range.

14. The signal processor of claim 6 where said first iteration variable or said second iteration variable produces 137 candidates over a range.

15. The signal processor of claim 6 where said first iteration variable or said second iteration variable produces 11 candidates over a range.

* * * * *